Jan. 20, 1953     E. B. NOLT     2,625,829
AUTOMATIC SLACK TAKE-UP MECHANISM
Filed Jan. 30, 1952
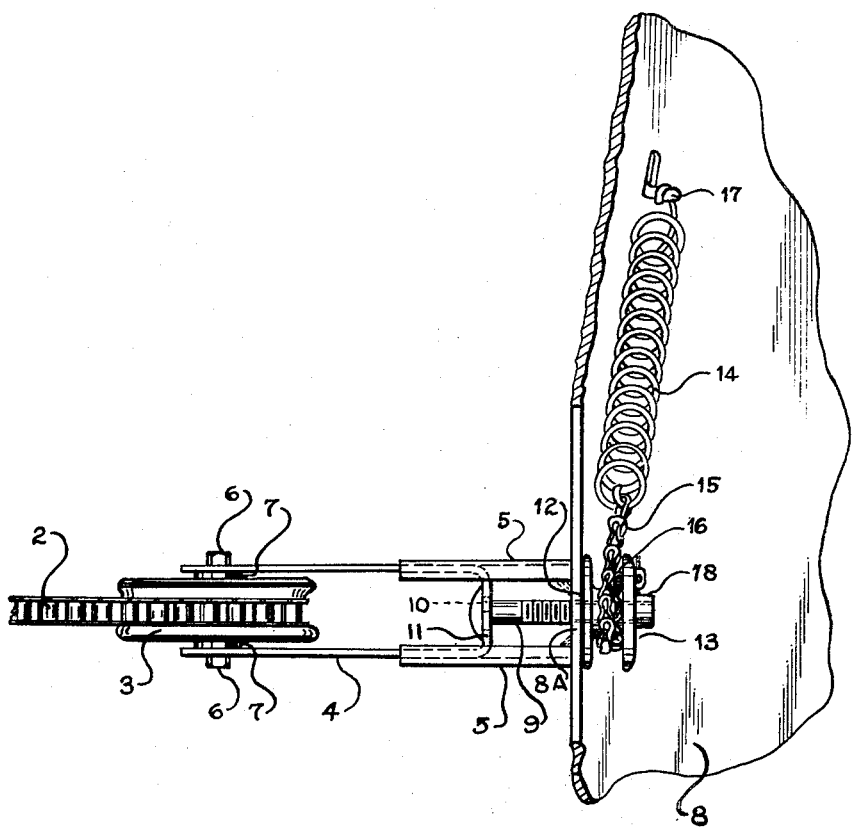
INVENTOR.
EDWIN B. NOLT
BY Richard E. Babcock Jr.
Attorney Patented Jan. 20, 1953

2,625,829

UNITED STATES PATENT OFFICE 2,625,829

AUTOMATIC SLACK TAKE-UP MECHANISM

Edwin B. Nolt, New Holland, Pa., assignor to The New Holland Machine Division of the Sperry Corporation, New Holland, Pa., a corporation of Delaware Application January 30, 1952, Serial No. 268,950

7 Claims. (Cl. 74—242.14)

This invention relates to an automatic slack take-up mechanism for drive belts, chains and other devices in which automatically initiated take-up movement is desired in order to compensate for wear, to take up slack and the like. It finds particular utility in connection with sprocket chains to automatically take up the slack resulting from wear and consequent lengthening of such chains, but is by no means limited to this particular use.

It is a primary object of the invention to provide a take-up device or mechanism which is capable of automatically initiated movement in small practically imperceptible increments as required to take up wear occurring during the normal usage of sprocket chains and the like, but which is also capable of continuous automatic movement through a wide range such as might be required to automatically draw a sprocket chain taut around its cooperating sprocket wheels following assembly of the chain over the wheels.

A further important object is the provision of a one-way take-up mechanism which acts in one direction only, to thus fixedly maintain any degree of adjustment which it may have attained, despite the imposition of retraction forces greater in magnitude than the force exerted in the take-up mechanism.

A still further object is the provision of such a take-up mechanism in a simple, economical constructed and practical form.

In the accompanying drawing the single figure, which is partly in elevation and partly in perspective, illustrates a preferred exemplification of my invention.

Referring now in detail to the accompanying drawing, the reference character 2 designates any conventional flexible power transmission element such as a sprocket chain, a portion only of which is shown. It will be understood that the chain is disposed around a plurality of sprocket wheels to transmit rotary movement from one to the other of said wheels in accordance with usual practice.

The chain 2 also passes around an idler wheel, exemplified by the sheave 3, which is rotatably supported by slide 4 disposed in guides or tracks 5—5.

In the preferred embodiment of the invention, the slide 4 is in the form of a U shaped bracket having parallel sides between the free ends of which the idler wheel 3 is rotatably supported by a shaft which is maintained in place by nuts 6 threaded thereon externally of the bracket arms. Washers 7 disposed on this shaft between the wheel 3 and the side arms of the bracket are for the purpose of reducing friction during rotation of the wheel 3. In this embodiment the guides or tracks 5—5 comprise opposed parallel channel members rigidly carried on and projecting from a suitable flat metal stationary support member 8. That portion 8A of the member 8 which extends between and connects the guides 5—5 may be regarded broadly as a portion of the guide means. The guides 5—5 are disposed with their channels opening toward each other to slideably receive the opposite sides of the slide or bracket 4.

It will be seen that movement of the slide 4 toward the support 8 will move the idler wheel 3 in a direction to take up any slack that may exist in the chain 2.

In order to cause such movement of the wheel 3 in such small increments as may be required to take up the slack caused by wear continuously occurring in the chain during its use, I provided threaded means in the form of a bolt 9 non-rotatably connected to the slide 4, as by having a non-circular shoulder 10 received in a conformingly shaped opening through the connecting portion or bridge 11 at the inner end of the slide 4. The free end of this bolt 9 or threaded element slideably projects parallel to the slide movement through or past a suitable abutment or support, such as the portion 8A of the support 8 which is fixedly positioned relative to the guide means.

Threaded on the bolt 9 at its free end portion and in rotary abutment with the fixed member or support 8 through a usual washer 12, is a nut 13. Due to disposition to the nut 13 on the side of the support or member 8 opposite from the slide 4 it will be readily apparent that turning the nut 13 in a direction to move it toward the slide or carriage 4 will result in drawing the slide 4 and idler wheel 3 toward the member 8 to take up any slack in the chain 2.

In accordance with the invention a spring or other resilient means 14 is associated with the nut 13 in any suitable manner whereby the spring will constantly exert a rotary force tending to rotate the nut 13 further onto the threaded element 9. Obviously this may be accomplished in various ways by different types and arrangements of spring actuated means. However, I prefer to utilize the simple and economical arrangement illustrated, in accordance with which the nut 13 assumes the form of a spool or sheave.

Wound around the nut 13 preferably for plurality of turns is a flexible tension element, such as the chain 15, one end of which is anchored to the nut as at 16 and the other end of which is connected to the spring 14. The spring 14 in this instance is a usual coil spring which is disposed under tension between the chain 15 and a stud 17 fixed to the stationary supporting member 8.

The flexible element 15 is wound about the nut 13 in a direction such that the resilient tension of the spring will tend constantly to rotate the nut further onto the threaded element 9 and thus move the slide 4 in a direction to take up any slack in the chain 2.

The nut 13 acts on the threaded element 9 to draw it through the opening in support 8 and thus take up slack in the chain as aforementioned. This action is exclusively a one-way one inasmuch as the frictional engagement between the threaded elements 9 and 13 will prevent retrogressive movement of the bolt 9 under any degree of force. In the event it is desired to back up the bolt 9 to permit the slackening or removal of chain 2, I provide on the nut 13 a preferably non-circular cross-section axial extension 18 arranged to facilitate easy engagement and rotation of the nut 13 by a usual wrench or hand tool against the action of spring 14.

Because of its aforementioned functions and advantages, it is obvious that my invention is by no means limited to its preferred use as a take-up device for a sprocket chain, but that the retractable slide or member 4 may be connected either directly or through the wheel 3 to any of a variety of device for a sprocket chain, but that the retractable slide or member 4 may be connected either directly or through the wheel 3 to any of a variety of devices or elements in which automatically regulated movement is desired, to compensate for wear, to take up slack or the like. In this application I have shown and described only the preferred embodiment of my invention simply by way of illustration of the practice of my invention as by law required. However, I realize that its several details may be modified in various ways without departing from my invention. Accordingly, the drawings and description herein are described merely as illustrative in nature and not as excluding other embodiments of my invention.

Having thus described my invention, I claim:

1. Automatic slack take-up mechanism comprising stationary guide means, a slide disposed for linear movement in said guide means, a stationary member adjacent said guide means, a threaded element fixed to and projecting parallel to the movement of said slide, said element being freely movable through an opening in said stationary member, a nut threaded on the free end portion of said element in rotary abutting relation with said stationary member, a flexible element anchored to and wound around said nut, a tension spring connected to said flexible element, and means maintaining said spring under tension to rotate said nut and thereby move said slide along said guide means.

2. Automatic slack take-up mechanism as defined in claim 1, including an idler wheel rotatably supported on said slide.

3. Mechanism as defined in claim 1 wherein the guide means comprise channeled tracks fixedly supported by said stationary member with their channels in opposed parallel relation, and said slide is disposed for movement in said channels.

4. Automatic slack take-up mechanism comprising guide means, a slide disposed for linear movement in said guide means, a member fixedly positioned relative to said guide means, a first threaded element fixed to said slide with its axis parallel to the movement thereof, a second threaded element in rotary abutment with said member and in threaded engagement with said first threaded element, and spring actuated means exerting a constant rotary force on said second threaded element to produce linear movement of said slide.

5. Mechanism as defined in claim 4, including an idler wheel rotatably carried by said slide.

6. Mechanism as defined in claim 4, including means for connecting said slide to a flexible power transmission element.

7. Automatic slack take-up mechanism comprising guide means, a slide member disposed for movement in said guide means, an abutment member fixedly positioned relative to said guide means, a first threaded element fixed to one of said members with its threaded axis parallel to the movement of said slide member, a second threaded element rotatably abutting against the other of said members and in threaded engagement with said first threaded element, and spring actuated means exerting a constant rotary force on said second threaded element.

EDWIN B. NOLT.

REFERENCES CITED

The following references are of record in the file of this patent:

UNITED STATES PATENTS

| Number | Name | Date |
|---|---|---|
| 1,503,500 | Heintz | Aug. 5, 1924 |
| 1,583,157 | Jett | May 4, 1926 |
| 2,284,821 | Heaslet | June 2, 1942 |